United States Patent Office 2,815,351
Patented Dec. 3, 1957

2,815,351

HETEROBICYCLIC COMPOUNDS AND PROCESS FOR THEIR PREPARATION

Harry A. Stansbury, Jr., South Charleston, and Howard R. Guest, Charleston, W. Va., assignors to Union Carbide Corporation, a corporation of New York No Drawing. Application May 12, 1954,
Serial No. 429,376

10 Claims. (Cl. 260—340.9)

This invention relates to new chemical compounds and to a process for their preparation. More particularly, the present invention relates to certain oxygen-containing heterobicyclic nitriles and their functional derivatives and to a process for their preparation.

The compounds to which the present invention relates have the following general formula:

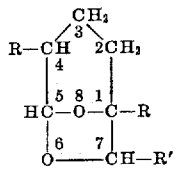

wherein R is a member selected from the class consisting of hydrogen and methyl radicals and R' is a member selected from the class consisting of cyano, aminomethyl, carboxy and carbalkoxy radicals.

Compounds of the above type may be referred to as substituted 6,8-dioxabicyclo(3.2.1) octanes, in accordance with the method of nomenclature described in "The Ring Index, Ring Systems Used in Organic Chemistry," by Patterson and Capell, Reinhold Publishing Co., 1940. Unless otherwise indicated, this method of nomenclature will be used throughout this specification.

Certain substituted 6,8-dioxabicyclo(3.2.1)octanes are known in the art. One class of compounds which has been described in the prior art can be represented by the general formula:

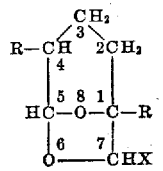

wherein R may be either hydrogen or a methyl group and X may be either hydrogen, an alkyloxy group or an acyloxy group. Compounds of this type are: 6,8-dioxabicyclo(3.2.1)octane; 1,4 - dimethyl - 6,8 - dioxabicyclo-(3.2.1)octane; 7-methoxy-1,4-dimethyl-6,8-dioxabicyclo-(3.2.1)octane; and 7 - acetoxy - 6,8 - dioxabicyclo(3.2.1)-octane.

A second class of compounds which has been described in the prior art have the following general formula:

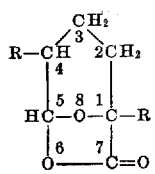

wherein R may be either hydrogen or a methyl group. Compounds of this type are: 7-oxo-6,8-dioxabicyclo-(3.2.1)octane and 1,4-dimethyl-7-oxo-6,8-dioxabicyclo-(3.2.1)octane.

The novel compounds of our invention are heterobicyclic nitriles and functional derivatives of heterobicyclic nitriles formed by subjecting said nitriles to hydrogenation, hydrolysis with mineral acids, and reaction with mineral acids in the presence of alcohols to form, respectively, the corresponding heterobicyclic amines, acids and esters. These compounds are separate and distinct in physical structure and chemical activity from the above-enumerated prior art compounds.

We have discovered that acrolein dimer (2,3-dihydro-2-formyl-1,4-pyran) and methacrolein dimer (2,3-dihydro-2,5-dimethyl-2-formyl-1,4-pyran) each reacts with hydrogen cyanide to form novel and useful heterobicyclic nitriles having the general formula:

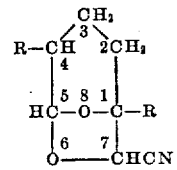

wherein R is a member selected from the group consisting of hydrogen and methyl groups. The two novel compounds represented by the above formula may be referred to as 7-cyano-1,4-dimethyl-6,8-dioxabicyclo(3.2.1)octane and 7-cyano-6,8-dioxabicyclo(3.2.1)octane.

The reaction may be conducted at a temperature of from about —10° C. to about 100° C. and preferably from about 0° C. to about 30° C., for a period of from about 10 minutes to about 300 minutes. Although the reaction may be conducted at a pressure of from about 150 p. s. i. a. to about 5 p. s. i. a., atmospheric pressure is preferred. The reaction may be conducted in the presence of a weakly alkaline catalyst, such as potassium cyanide or pyridine, which catalyzes the addition of hydrogen cyanide to the carbonyl group. The resulting dimer cyanohydrins are too unstable to refine by distillation. When the crude dimer cyanohydrins (containing the weakly alkaline catalysts) are acidified and distilled, the expected cyanohydrins are not isolated. Contrary to what would be expected, the products which are recovered are the above-described heterobicyclic nitriles.

Hydrogenation of these nitriles at temperatures of from about 10° C. to about 180° C. and pressures of from about 15 p. s. i. a. to about 1000 p. s. i. a. for from about 2 hours to about 20 hours results in a class of novel compounds having the general formula:

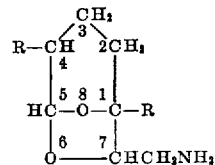

wherein R is a member selected from the class consisting of hydrogen and methyl radicals. Members of this class of compounds comprise 7-aminomethyl-1,4-dimethyl-6,8-dioxabicyclo(3.2.1)octane and 7-aminomethyl-6,8-dioxabicyclo(3.2.1)octane.

Hydrolysis of the novel nitriles of our invention with mineral acids, such as HCl, at temperatures of from about 30° C. to about 150° C. and pressures of from about 15 p. s. i. a. to about 150 p. s. i. a. for from about 2 hours to about 100 hours results in a class of novel compounds having the formula:

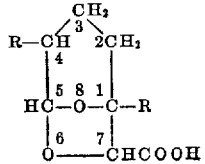

wherein R is a member selected from the group consisting of hydrogen and methyl radicals. Members of this class of compounds comprise 1,4-dimethyl-6,8-dioxabicyclo(3.2.1)octane-7-carboxylic acid and 6,8-dioxabicyclo-(3.2.1)octane-7-carboxylic acid.

Reacting the novel nitriles of our invention with mineral acids in the presence of alchols, such as ethanol, at temperatures of from about 20° C. to about 140° C. and pressures of from about 15 p. s. i. a. to about 150 p. s. i. a. for from about 1 hour to about 20 hours results in a class of novel compounds having the formula:

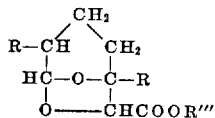

wherein R is a member selected from the class consisting of hydrogen and methyl radicals and R''' is an alkyl radical. These novel esters may also be prepared by reacting the novel acids of our invention with a suitable alcohol. Members of this class of compounds comprise 7-carbalkoxy-1,4-dimethyl-6,8-dioxabicyclo(3.2.1)octanes and 7-carbalkoxy-6,8-dioxabicyclo(3.2.1)octanes.

The following examples are given to illustrate the preparation of some of the novel compounds of our invention.

EXAMPLE I

A mixture of 81 gms. of hydrogen cyanide (3 moles) and 1.0 gm. of potassium cyanide (.015 equivalent) was stirred at 25° C. while 420 gms. of methacrolein dimer (3 moles) were fed into the mixture over a period of 35 minutes. After the mixture was stirred for 20 minutes longer at 25° C., it was acidified with 2 cc. of concentrated hydrochloric acid. Heat was evolved after the addition of the acid. The crude product was distilled under reduced pressure to obtain the fractions described in Table I. Analyses of these fractions by bromination detected only traces of unsaturation. The infra-red absorption of these cuts indicated that only insignificant amounts of the hydroxyl and carbonyl groups were present. Therefore these fractions were not the expected metharcrolein dimer cyanohydrin but were 7-cyano-1,4-dimethyl-6,8-dioxabicyclo(3.2.1)octane. The broad distillation range of the product indicated the presence of several stereoisomers due to the cis and trans relationships between the nitrile group, the two methyl groups and the heterocyclic rings. The yield and efficiency were each 89 percent.

*Table 1.—7-cyano-1,4-dimethyl-6,8-dioxabicyclo(3.2.1)octane*

| Fraction: | Distillation range, ° C. | Sp. g., 20/20° | $n_D^{30}$ | Percent N | Percent C | Percent H |
|---|---|---|---|---|---|---|
| 1 | 71–81°/3 mm. Hg | 1.082 | 1.4544 | 8.4 | 64.7 | 8.2 |
| 2 | 81–96°/3 mm. Hg | 1.082 | 1.4559 | 8.6 | 64.1 | 8.0 |
| 3 | 96–108°/3 mm. Hg | 1.083 | 1.4573 | 8.1 | 64.8 | 8.1 |
| Theory | | | | 8.4 | 64.7 | 7.8 |

A composite of fractions 1, 2 and 3 (Table I) was milled 5 minutes with 1.5 parts by weight of a high molecular weight copolymer of 97 percent vinyl chloride and 3 percent vinyl acetate at 158° C. The resulting plasticized sheet was clear and flexible. There was no indication of "sweat-out" after six weeks.

A composite of fractions 1, 2 and 3 (Table I) was milled 5 minutes at 140° C. with 1.5 parts by weight of a copolymer of approximately 60 percent vinyl chloride and 40 percent acrylonitrile. The resulting plasticized sheet was clear and flexible. After six weeks, there still was no evidence of "sweat-out."

EXAMPLE II

A mixture of 276 gms. of ethanol (6 moles), 11 cc. of water (0.6 mole) and 40 gms. of hydrogen chloride (1.1 moles) was stirred at 40°–45° C. while 100 gms. of 7-cyano-1,4-dimethyl-6,8-dioxabicyclo(3.2.1)octane (0.6 mole) were added to the mixture over a period of 15 minutes. After the mixture was stirred and refluxed at 74–81° for 3 hours, it was cooled to 25° C. and filtered to remove ammonium chloride. The filtrate was fractionated under reduced pressure to obtain 7-carbethoxy-1,4-dimethyl-6,8-dioxabicyclo(3.2.1)octane having these properties: boiling range 116°–120° C./6 mm. Hg, 95.7 percent purity by analytical saponification, found 61.8 percent C (theory 61.7 percent), found 8.3 percent H (theory 8.4 percent H), $n_D^{30}$ 1.4525, sp. g. 20/20° 1.094. The yield of ester was 47 percent, while the efficiency was about 90 percent.

EXAMPLE III

While 180 gms. of 37 percent concentrated hydrochloric acid (1.8 moles) were stirred at 60°–64° C., 100 gms. of 7 - cyano - 1,4 - dimethyl-6,8-dioxabicyclo(3.2.1)octane (.6 mole) were fed to the mixture over a period of 15 minutes. After the mixture was stirred and refluxed at 100°–110° C. for 3 hours, it was diluted with 100 cc. of water and refluxed 4 hours more. The reaction mixture was cooled to 25° C. and extracted twice with 150 cc. portions of isopropyl ether. The extracts were combined and fractionated to obtain 1,4-dimethyl-6,8-dioxabicyclo(3.2.1)octane-7-carboxylic acid having these properties: boiling range 119°–123° C./2 mm. Hg, 93.6 percent purity by titration with standard alkali, $n_D^{30}$ 1.4722. The yield of this viscous acid was 69 percent, while the efficiency was 85 percent.

EXAMPLE IV

A mixture of 680 gms. of 7-cyano-1,4-dimethyl-6,8-dioxabicyclo(3.2.1)octane (4.07 moles), 70 gms. of anhydrous ammonia (4.07 moles) and 37 gms. of Raney nickel was hydrogenated at 95°–100° C. at 500 p. s. i. g. for 7 hours. The mixture was filtered to remove the catalyst and distilled to obtain 7-aminomethyl-1,4-dimethyl-6,8-dioxabicyclo(3.2.1)octane having these properties: boiling range 65–70° C./1 mm. Hg, sp. g. 20/20° 1.061, $n_D^{30}$ 1.4710, 99.5 percent purity as the amine by analysis with standard perchloric acid. This colorless, water-miscible amine was formed with 88 percent yield and 88 percent efficiency.

EXAMPLE V

A mixture of 30 gms. of hydrogen cyanide (1.1 moles) and 1 cc. of pyridine catalyst was stirred at 0° C. while 112 gms. of acrolein dimer (1 mole) were added to the mixture over a period of 30 minutes. The colorless reaction mixture was distilled rapidly under reduced pressure to obtain a product having these properties: boiling range 108°–110° C./mm. Hg, sp. g. 20/20° C. 1.182, 9.9 percent N found by the Dumas method and analyzing 12.0 percent as acrolein dimer cyanohydrin by analytical bromination. Infra-red absorption studies indicated the presence of minor amounts of hydroxyl and carbon-carbon unsaturation with only a trace of aldehyde. These results indicate that the distilled product is about 89 percent 7-cyano-6,8-dioxabicyclo(3.2.1)octane, 9 percent acrolein dimer cyanohydrin and about 2 percent acrolein dimer. The yield of distilled product was 81 percent based on acrolein dimer.

EXAMPLE VI

The reaction of acrolein dimer and hydrogen cyanide was carried out as described above (Example V) and acidified with acetic acid. The crude product (1 mole) was fed at 50–60° C. to a solution of 83 gms. of hydrogen chloride (2.27 moles) in 230 gms. of ethanol (5 moles) and 18 gms. of water (1 mole). After the addition, which required 20 minutes, the mixture was refluxed 40 minutes. The ammonium chloride was filtered and washed with 200 cc. of ethanol. It weighed 51 gms. (theoretical 53.5 gms.). The filtrate was distilled under reduced pressure to obtain 7-carbethoxy-6,8-dioxabicyclo(3.2.1-octane having these properties: distillation range 89–95° C./mm. Hg, $n_D^{30}$ 1.4580, sp. g. 20/20° 1.170, 97.5 percent ester by analytical saponification, 57.4 percent C (theory 58.1 percent), 7.5 percent H (theory 7.5 percent), contained only a trace of unsaturation by analytical bromination. Infra-red absorption studies with the compound indicated the absence of unsaturation and of aldehyde. The yield and efficiency were both 43 percent based on acrolein dimer.

The compounds of our invention are useful as chemical intermediates for the preparation of derived organic compounds and exert a beneficient solvent action upon numerous substances. They are valuable as plasticizers for certain synthetic organic resins and are of particular value as plasticizers for vinyl chloride-vinyl acetate copolymers and vinyl chloride-acrylonitrile copolymers.

We claim:

1. Chemical compounds having the formula:

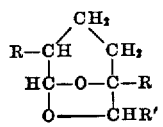

wherein R is a member selected from the class consisting of hydrogen and methyl radicals and R' is a member selected from the class consisting of cyano, aminomethyl, carboxy and a lower carbalkoxy radicals.

2. A chemical compound having the formula:

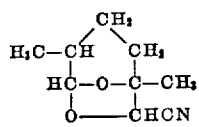

3. A chemical compound having the formula:

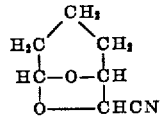

4. A chemical compound having the formula:

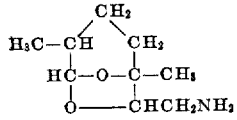

5. A chemical compound having the formula:

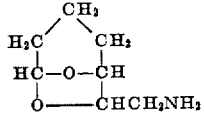

6. A chemical compound having the formula:

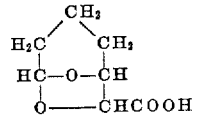

7. The process of producing a compound having the formula:

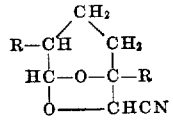

wherein R is a member selected from the class consisting of hydrogen and methyl radicals, which comprises bringing into reactive admixture a compound having the general formula:

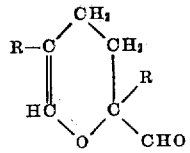

wherein R is a member selected from the group consisting of hydrogen and methyl radicals, with hydrogen cyanide at a temperature of from about −10 to 100° C. and a pressure of from about 5 to 150 p. s. i. a.

8. The process of producing a compound having the formula:

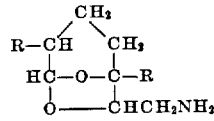

wherein R is a member selected from the class consisting of hydrogen and methyl radicals which comprises bringing into reactive admixture a compound having the general formula:

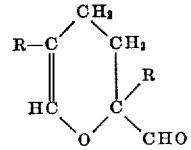

wherein R is a member selected from the group consisting of hydrogen and methyl radicals, with hydrogen cyanide at a temperature of from about −10 to 100° C. and a pressure of from about 5 to 150 p. s. i. a. and to produce a nitrile, and bringing said nitrile into reactive admixture with hydrogen at a temperature of from about 10 to 180° C. and a pressure of from about 15 to 1000 p. s. i. a.

9. The process of producing a compound having the general formula:

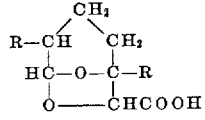

wherein R is a member selected from the class consisting of hydrogen and methyl radicals which comprises bringing into reactive admixture a compound having the general formula:

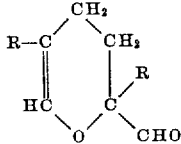

wherein R is a member selected from the group consisting of hydrogen and methyl radicals, with hydrogen cyanide at a temperature of from about −10 to 100° C. and a pressure of from about 5 to 150 p. s. i. a. and to produce a nitrile, and bringing said nitrile into reactive admixture with a mineral acid at a temperature of from about 30 to 150° C. and a pressure of from about 15 p. s. i. a. to about 150 p. s. i. a.

10. The process of producing a compound having the general formula:

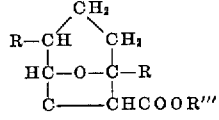

wherein R is a member selected from the class consisting of hydrogen and methyl radicals and R''' is a lower alkyl radical which comprises bringing into reactive admixture a compound having the general formula:

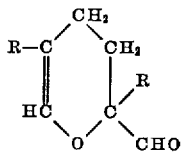

wherein R is a member selected from the group consisting of hydrogen and methyl radicals, with hydrogen cyanide at a temperature of from about −10 to 100° C. and a pressure of from about 5 to 150 p. s. i. a. and to produce a nitrile, and bringing said nitrile into reactive admixture with a mineral acid and a lower alkanol at a temperature of from about 20 to 140° C. and a pressure of from about 15 to 150 p. s. i. a.

References Cited in the file of this patent

UNITED STATES PATENTS

| | | |
|---|---|---|
| Re. 23,345 | Smith | Feb. 27, 1951 |
| 2,489,729 | Smith | Nov. 29, 1949 |
| 2,511,890 | Whetstone | June 20, 1950 |
| 2,511,891 | Whetstone | June 20, 1950 |

OTHER REFERENCES

Spath et al.: Monatsh. fur Chemie 76, pp. 297–310 (1946).

UNITED STATES PATENT OFFICE

CERTIFICATE OF CORRECTION

Patent No. 2,815,351

December 3, 1957

Harry A. Stansbury, Jr., et al.

It is hereby certified that error appears in the printed specification of the above numbered patent requiring correction and that the said Letters Patent should read as corrected below.

Column 5, line 3, for "89-95° C./mm." read -- 89-95° C./2 mm. --.

Signed and sealed this 21st day of January 1958.

(SEAL)
Attest:

KARL H. AXLINE
Attesting Officer

ROBERT C. WATSON
Commissioner of Patents